(12) United States Patent
Chen et al.

(10) Patent No.: US 11,199,760 B2
(45) Date of Patent: Dec. 14, 2021

(54) OPTICAL MODULE AND PROJECTOR

(71) Applicant: Coretronic Corporation, Hsin-Chu (TW)

(72) Inventors: Yi-Chang Chen, Hsin-Chu (TW); Shou-Cheng Huang, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/067,780

(22) Filed: Oct. 12, 2020

(65) Prior Publication Data

US 2021/0109427 A1 Apr. 15, 2021

(30) Foreign Application Priority Data

Oct. 15, 2019 (CN) .......................... 201921721673.0

(51) Int. Cl.
*G03B 21/14* (2006.01)
*G03B 21/00* (2006.01)

(52) U.S. Cl.
CPC ......... *G03B 21/142* (2013.01); *G03B 21/005* (2013.01)

(58) Field of Classification Search
CPC .... G03B 21/14; G03B 21/142; G03B 21/006; G03B 21/005; G03B 21/008
USPC .................................................. 353/31, 119
See application file for complete search history.

(56) References Cited

U.S. PATENT DOCUMENTS

| 5,959,789 A | 9/1999 | Rando |
| 9,030,765 B2 * | 5/2015 | Okada ..................... G03B 3/10 |
| | | 359/819 |
| 10,948,808 B2 * | 3/2021 | Huang .................. G02B 7/003 |
| 2012/0145872 A1 | 6/2012 | Heidemann et al. |
| 2020/0272035 A1 * | 8/2020 | Nemura ................. H04N 9/317 |
| 2021/0247671 A1 * | 8/2021 | Wakabayashi ....... G03B 21/142 |

FOREIGN PATENT DOCUMENTS

| CN | 208969410 | 6/2019 |
| CN | 209514287 | 10/2019 |

* cited by examiner

*Primary Examiner* — William C. Dowling
(74) *Attorney, Agent, or Firm* — JCIPRNET

(57) ABSTRACT

The invention provides an optical module, including a first frame body, a second frame body, a first adjustment member, and a first optical component. The first frame body is rotatably connected to a base body and includes a first adjustment portion and a boss, and the first adjustment portion drives the first frame body to rotate with a first axial line as a rotating axis. The second frame body is rotatably connected to the first frame body and includes a second adjustment portion. The first adjustment member is screwed to the boss and moves along the first axial line relative to the boss to push the second adjustment portion and drive the second frame body to rotate with a second axial line as a rotating axis. The first optical component is disposed on the second frame body. The invention further provides a projector including the foregoing optical module.

20 Claims, 14 Drawing Sheets

OPTICAL MODULE AND PROJECTOR

CROSS-REFERENCE TO RELATED APPLICATION

This application claims the priority benefit of China application serial no. 201921721673.0, filed on Oct. 15, 2019. The entirety of the above-mentioned patent application is hereby incorporated by reference herein and made a part of this specification.

BACKGROUND

Technical Field

The disclosure relates to an optical module and a projector, and in particular, to an optical module and a projector capable of finely adjusting a rotation angle.

Description of Related Art

In general, in order to optimize brightness and/or color temperature of a light beam emitted by an apparatus (such as a projector) with an optical engine, an assembler confirms and adjusts an angle of an optical component (such as a reflector or a lens) in the optical engine before delivery. However, how to adjust the angle of the optical component quickly, simply and accurately is a subject to be discussed by those skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an optical module, which can finely adjust a rotation angle quickly, simply and accurately.

The invention provides a projector, which has the foregoing optical module.

Other objectives and advantages of the invention may be further understood from the technical features disclosed in the invention.

To achieve one or some or all of the foregoing objectives or other objectives, an optical module of the invention includes a first frame body, a second frame body, a first adjustment member, and a first optical component. The first frame body is rotatably connected to a base body, where the first frame body includes a first adjustment portion and a boss that are located on a same side of the first frame body, and the first adjustment portion drives the first frame body to rotate with a first axial line as a rotating axis. The second frame body is rotatably connected to the first frame body, and the second frame body includes a second adjustment portion. The first adjustment member is screwed to the boss. The first adjustment member moves along the first axial line relative to the boss to push the second adjustment portion and drive the second frame body to rotate with a second axial line as a rotating axis. The first optical component is disposed on the second frame body.

A projector of the invention includes a light source, a light valve, a projection lens, and an optical module. The light source provides an illumination beam. The light valve is disposed on a transmission path of the illumination beam and converts the illumination beam into an image beam. The projection lens is disposed on a transmission path of the image beam and projects the image beam to outside the projector. The optical module is located on the transmission path of the illumination beam or the image beam. The optical module includes a first frame body, a second frame body, a first adjustment member, and a first optical component. The first frame body is rotatably connected to a base body, where the first frame body includes a first adjustment portion and a boss that are located on a same side of the first frame body, and the first adjustment portion drives the first frame body to rotate with a first axial line as a rotating axis. The second frame body is rotatably connected to the first frame body, and the second frame body includes a second adjustment portion. The first adjustment member is screwed to the boss. The first adjustment member moves along the first axial line relative to the boss to push the second adjustment portion and drive the second frame body to rotate with a second axial line as a rotating axis. The first optical component is disposed on the second frame body.

Based on the above, the first adjustment portion of the optical module of the invention drives the first frame body to rotate with the first axial line as the rotating axis, and the first adjustment member moves along the first axial line relative to the boss to push the second adjustment portion and drive the second frame body to rotate with the second axial line as the rotating axis, so that the first optical component moves along both axes. The projector of the invention can provide a relatively good optical effect through the foregoing optical module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
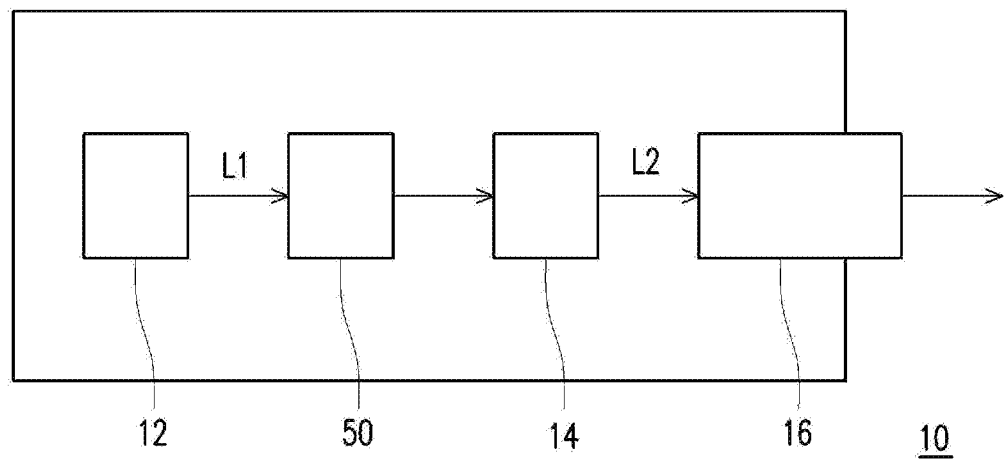
FIG. 1A is a schematic diagram of a projector according to an embodiment of the invention.
Figure 2:
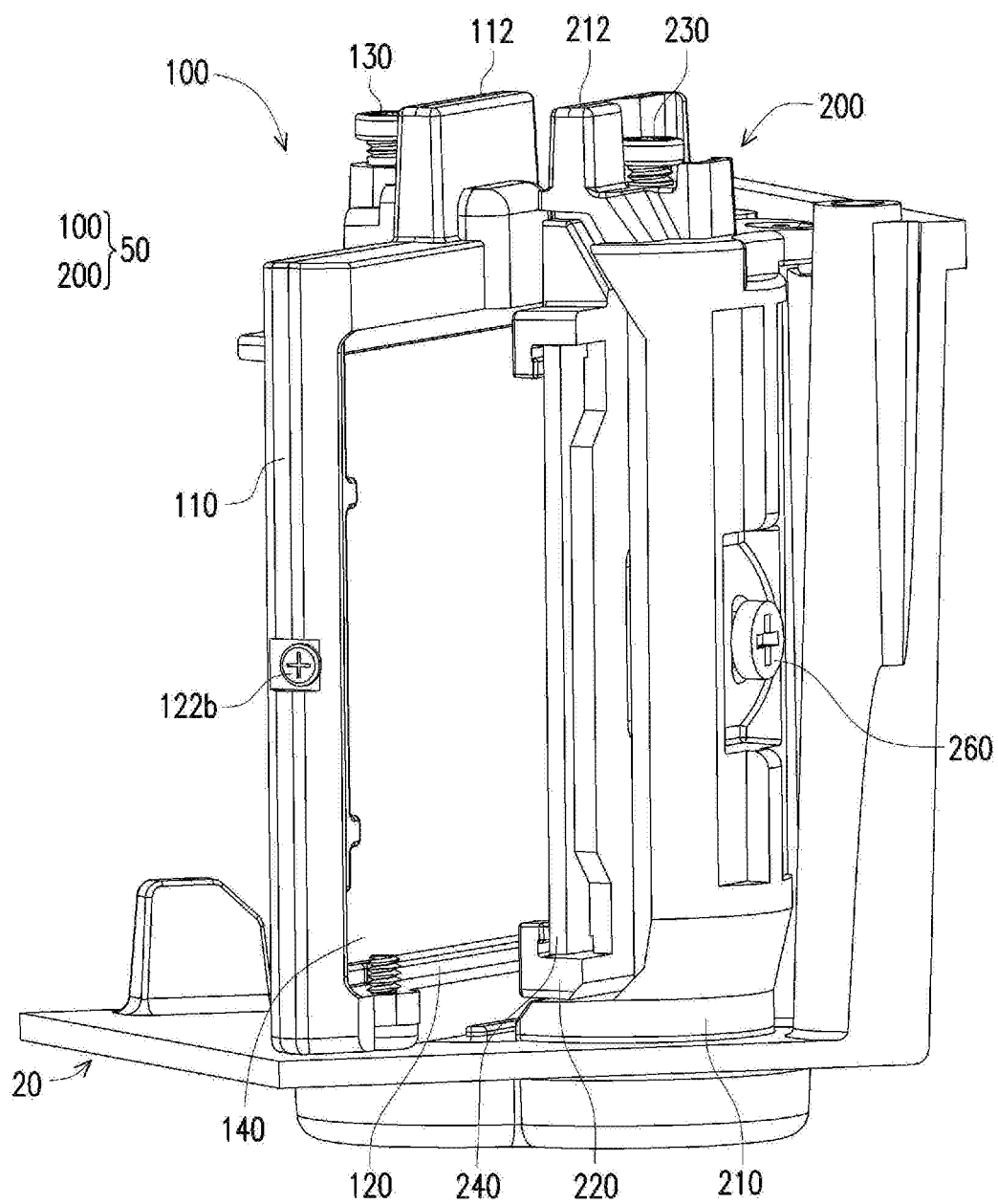
FIG. 2 is a schematic diagram of an optical module assembly according to an embodiment of the invention.

FIG. 1A is a schematic diagram of a projector according to an embodiment of the invention. It should be noted that FIG. 1A only schematically shows a relative position of components and simple optical path inside a projector 10, and a form of the projector 10 is not limited thereto. Referring to FIG. 1A, the projector 10 of the embodiment includes a light source 12, an optical module assembly 50 (for example, having optical modules 100, 200, as shown in FIG. 2), a light valve 14, and a projection lens 16.

In the embodiment, the light source 12 is used to emit a first light beam L1. The first light beam L1 is, for example, an illumination beam. In the embodiment, a laser light source is used as an example of the light source 12. For example, the light source 12 may include a plurality of laser diodes (not shown) arranged in an array, but the invention is not limited thereto.

In the embodiment, the optical module assembly 50 is disposed on an optical path of the first light beam L1 for receiving the first light beam L1 from the light source 12. In the embodiment, the optical module assembly 50 includes, for example, a reflector or/and a beam splitter. The reflector may change a path of a light beam. The beam splitter may be a partially penetrating partial reflection component, a color separation component, a polarization beam splitting component, or other various assemblies that can split light beams. For example, in the embodiment, the optical module assembly 50 may, for example, allow a blue light beam to penetrate while providing a reflection effect of light beams of other colors (such as red, green, yellow, etc.). Definitely, the form of the optical module assembly 50 is not limited thereto. In the embodiment, the projector 10 may alternatively configure a light homogenization component (not shown) after the optical path of optical module assembly 50 (i.e., along the optical path of the first light beam L1, the light homogenization component is disposed after the optical module assembly 50). The light homogenization component includes an integrated rod that can homogenize the passed light beam, but the invention is not limited thereto.

Next, the light valve 14 is disposed after the optical path of the optical module assembly 50 (i.e., along the optical path of the first light beam L1, the light valve 14 is disposed after the optical module assembly 50) to convert the first light beam L1 passing through the optical module assembly 50 into a second light beam L2. The second light beam L2 is, for example, an image beam. In the embodiment, the light valve 14 is, for example, a digital micro-mirror device (DMD) or a liquid-crystal-on-silicon panel (LCOS panel). However, in other embodiments, the light valve 14 may also be a transmissive liquid crystal panel or other beam modulators. Finally, the projection lens 16 is disposed on a path of the image beam L2 for projecting the image beam L2.

Figure 1B:
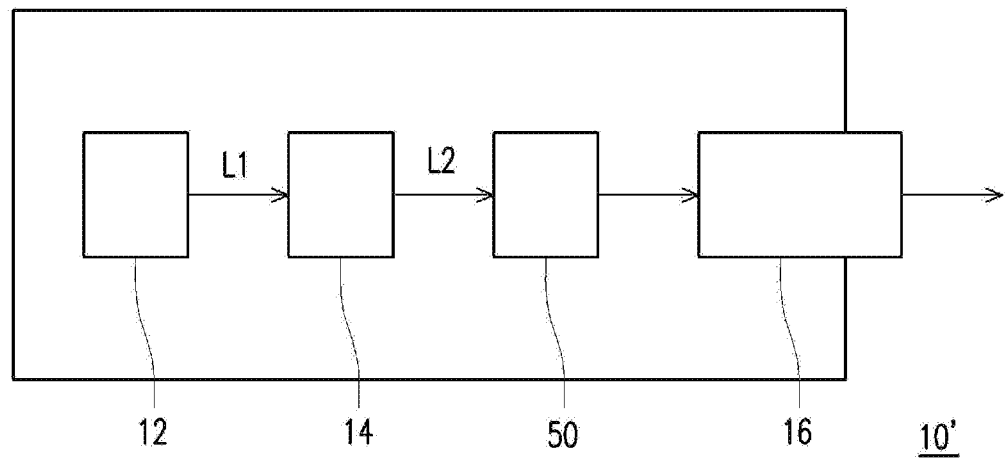
FIG. 1B is a schematic diagram of a projector according to another embodiment of the invention.

FIG. 1B is a schematic diagram of a projector according to another embodiment of the invention. Referring to FIG. 1B, a main difference between a projector 10' of FIG. 1B and the projector 10 of FIG. 1A is that, in FIG. 1B, an optical module assembly 50 is disposed on an optical path between a light valve 14 and a projection lens 16.

In the foregoing projectors 10, 10', because the optical module assembly 50 (for example, having optical modules 100, 200, as shown in FIG. 2) is used, an assembler may adjust a rotation angle of an optical component quickly, simply, and accurately, to provide good optical quality and further adjust brightness and/or color temperature of beams emitted by the projectors 10, 10'. Definitely, in other embodiments, the projectors 10, 10' may also only have a single optical module 100 or 200, which can also achieve an effect of quickly, simply and accurately adjusting a rotation angle of the optical component. In particular, the optical modules 100 and 200 of the invention may be considered as different implementations, which may be used separately, or may be combined and applied to the projector 10. The optical module assembly 50 (optical modules 100, 200) is described below.

Figure 3:
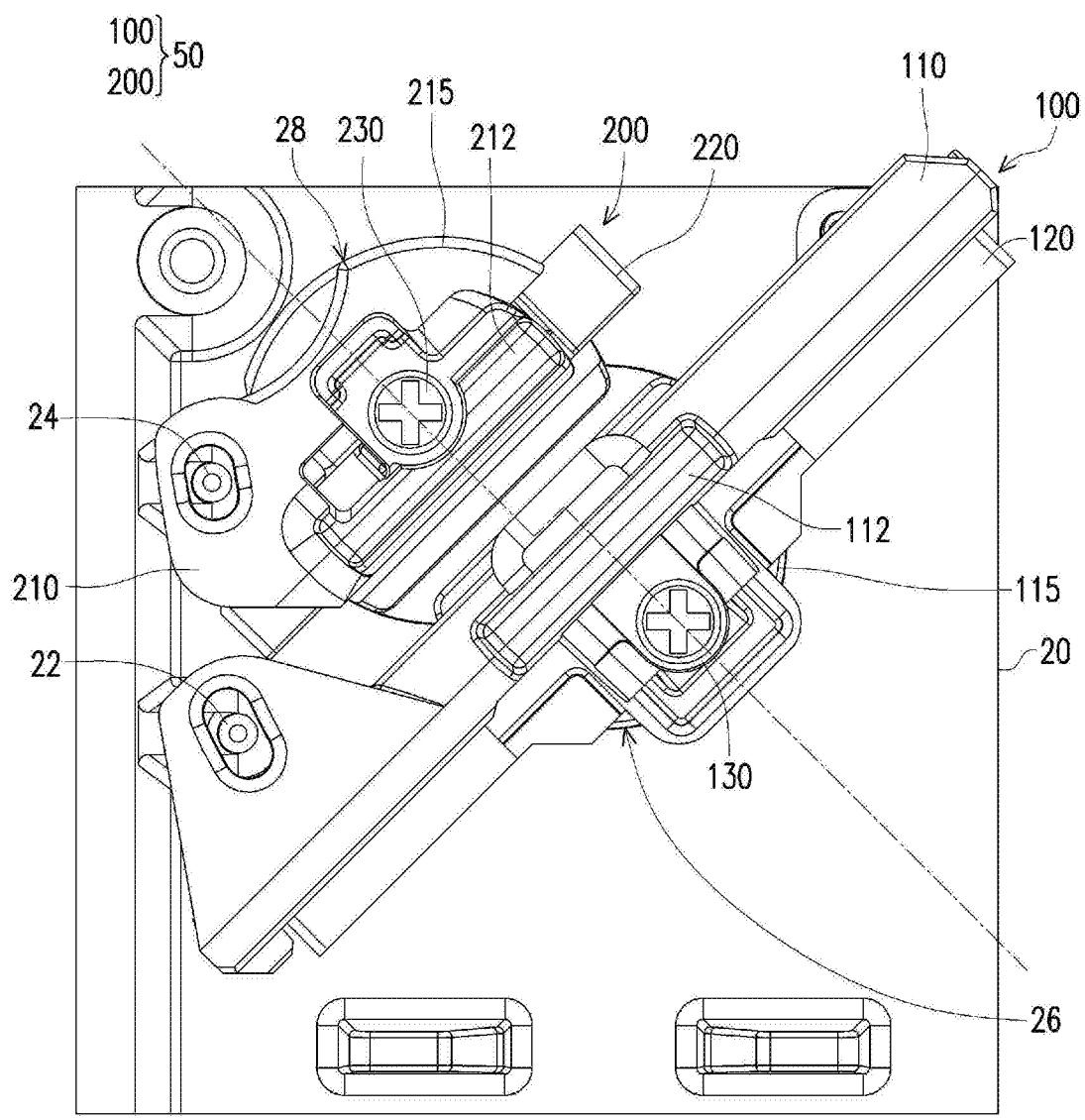
FIG. 3 is a schematic top view of FIG. 2.
Figure 4:
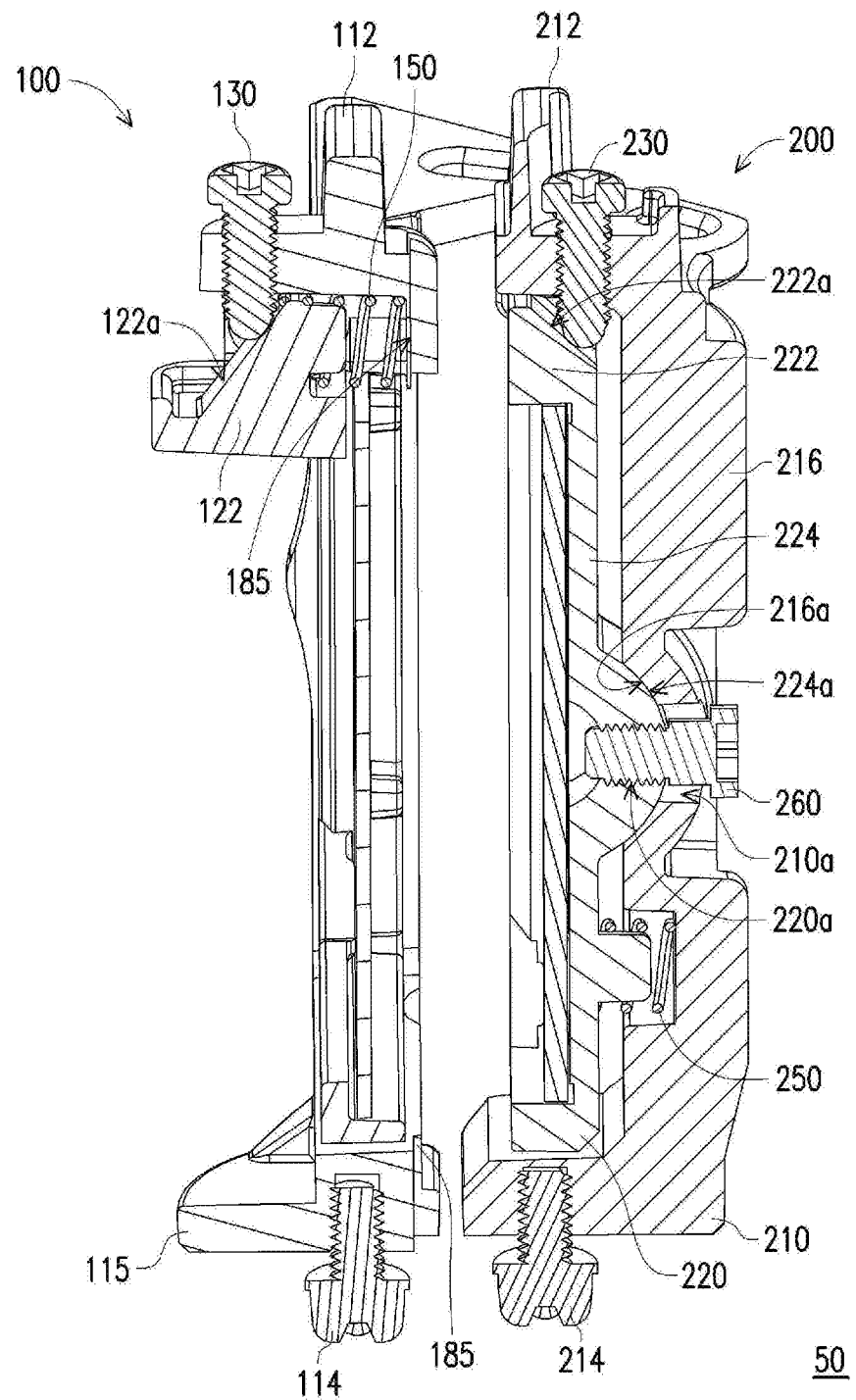
FIG. 4 is a schematic cross-sectional view of an optical module assembly of FIG. 2.
Figure 5:
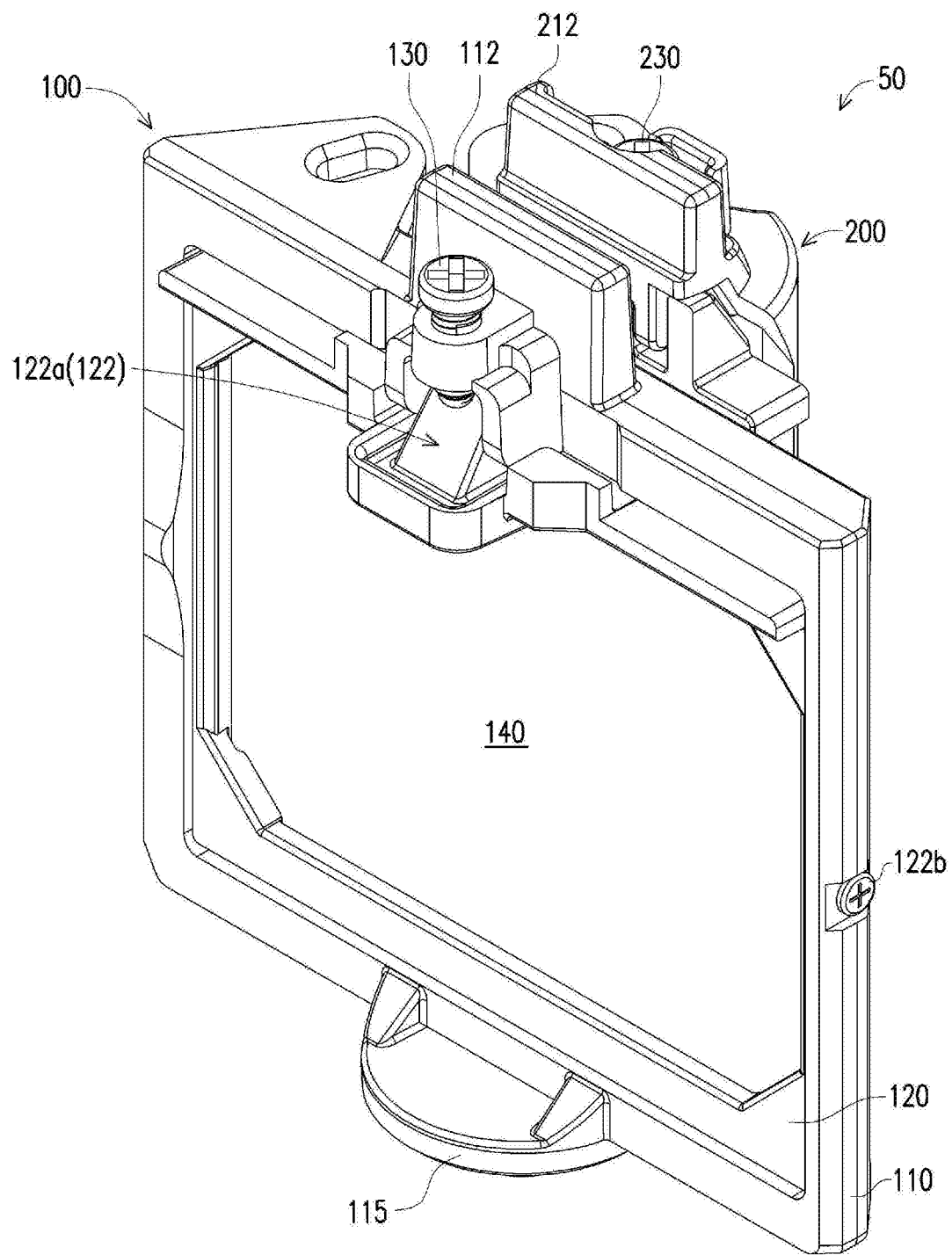
FIG. 5 is a schematic perspective diagram of an optical module assembly of FIG. 2.

FIG. 2 is a schematic diagram of an optical module assembly according to an embodiment of the invention. FIG. 3 is a schematic top view of FIG. 2. FIG. 4 is a schematic cross-sectional view of an optical module assembly of FIG. 2. FIG. 5 is a schematic perspective diagram of an optical module assembly of FIG. 2. Referring to FIG. 2 to FIG. 5, the optical module assembly 50 of the embodiment may be applied to a display apparatus such as projectors 10 and 10'. The optical module assembly 50 includes optical modules 100 and 200 arranged in a front-rear direction, and the optical modules 100 and 200 are disposed on a base body 20. In the embodiment, a first optical component 140 of the optical modules 100 and 200 is, for example, a beam splitter, and another first optical component 240 is a reflector. However, the invention is not limited thereto, and in other embodiments, the first optical components 140, 240 may both be beam splitters. In the embodiment, the optical modules 100, 200 are each capable of biaxially adjusting rotation angles of the first optical component 140, 240, so that brightness and/or color temperature of a beam emitted by an apparatus having the optical module 100 or 200 (for example, the projectors 10, 10') can be optimized. Definitely, the optical module 100 or 200 may also be applied to other apparatuses, and is not limited to the above. In addition, referring to FIG. 1A and FIG. 3 together, the first light beam L1 from the light source 12 is sequentially transmitted to the optical module 100 and then transmitted to the optical module 200. Referring to FIG. 1B and FIG. 3, the second light beam L2 from the light valve 14 is sequentially transmitted to the optical module 100 and then transmitted to the optical module 200.

Figure 6:
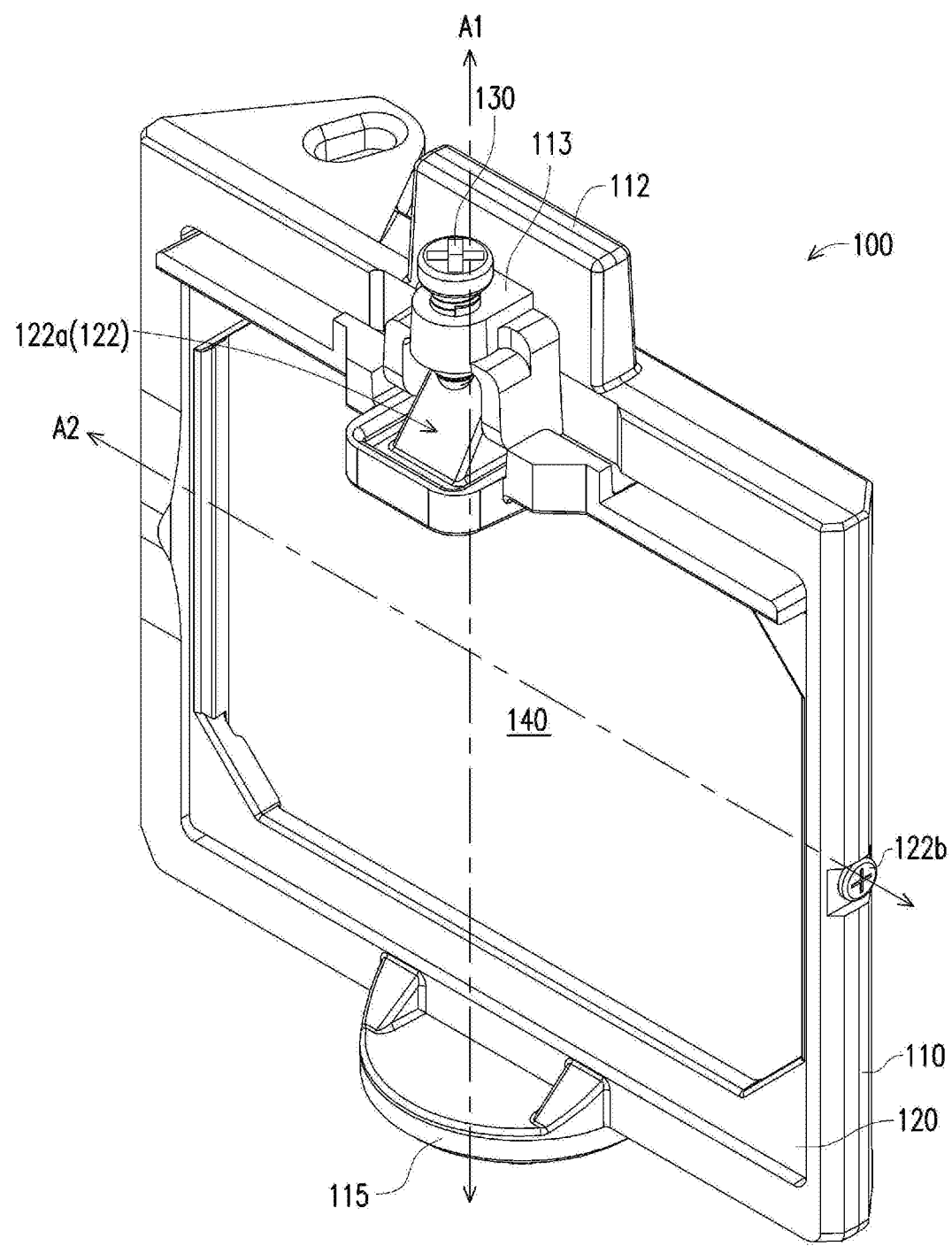
FIG. 6 is a schematic perspective diagram of one optical module of an optical module assembly of FIG. 2.
Figure 7:
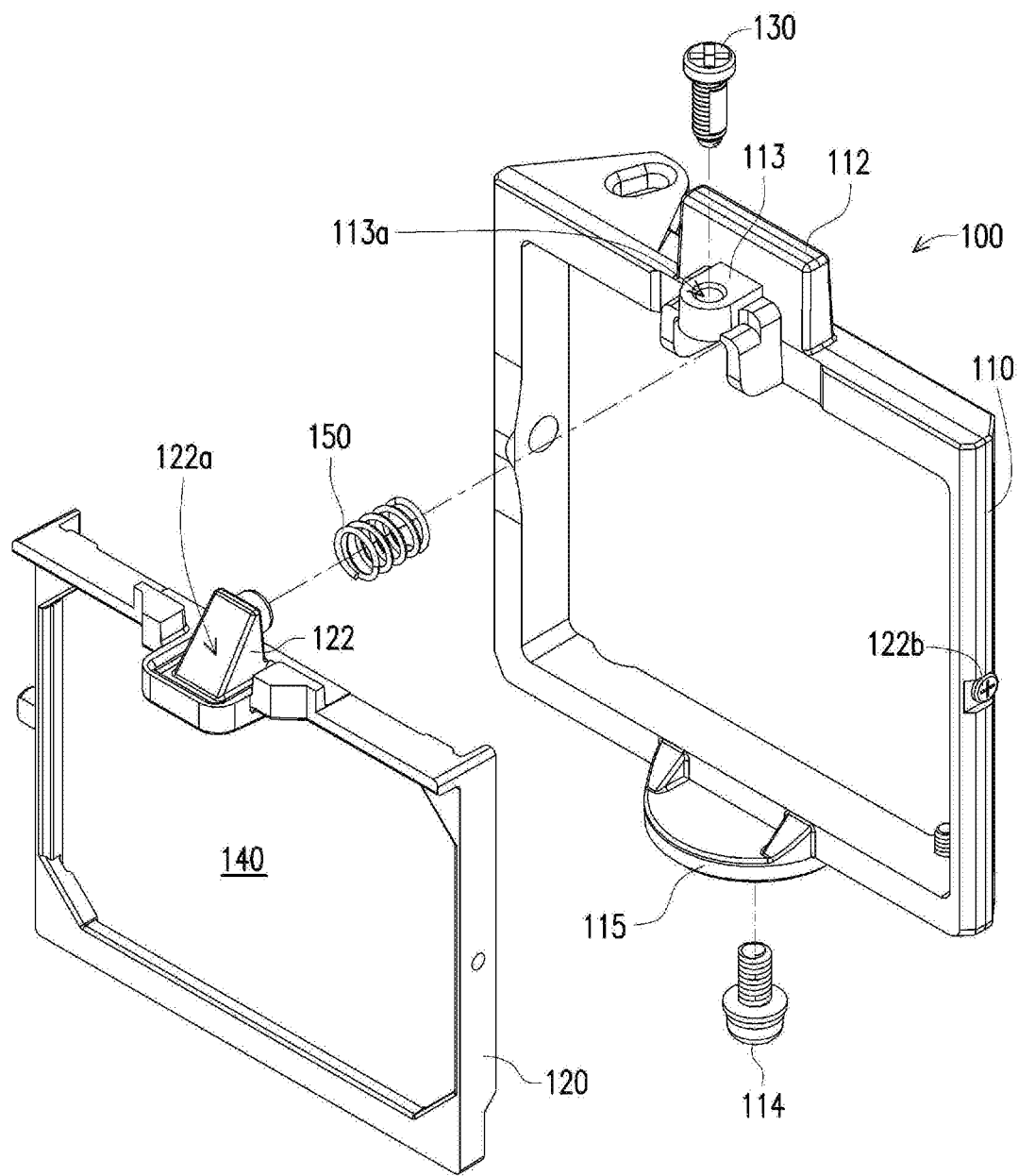
FIG. 7 is a schematic exploded view of FIG. 6.
Figure 8:
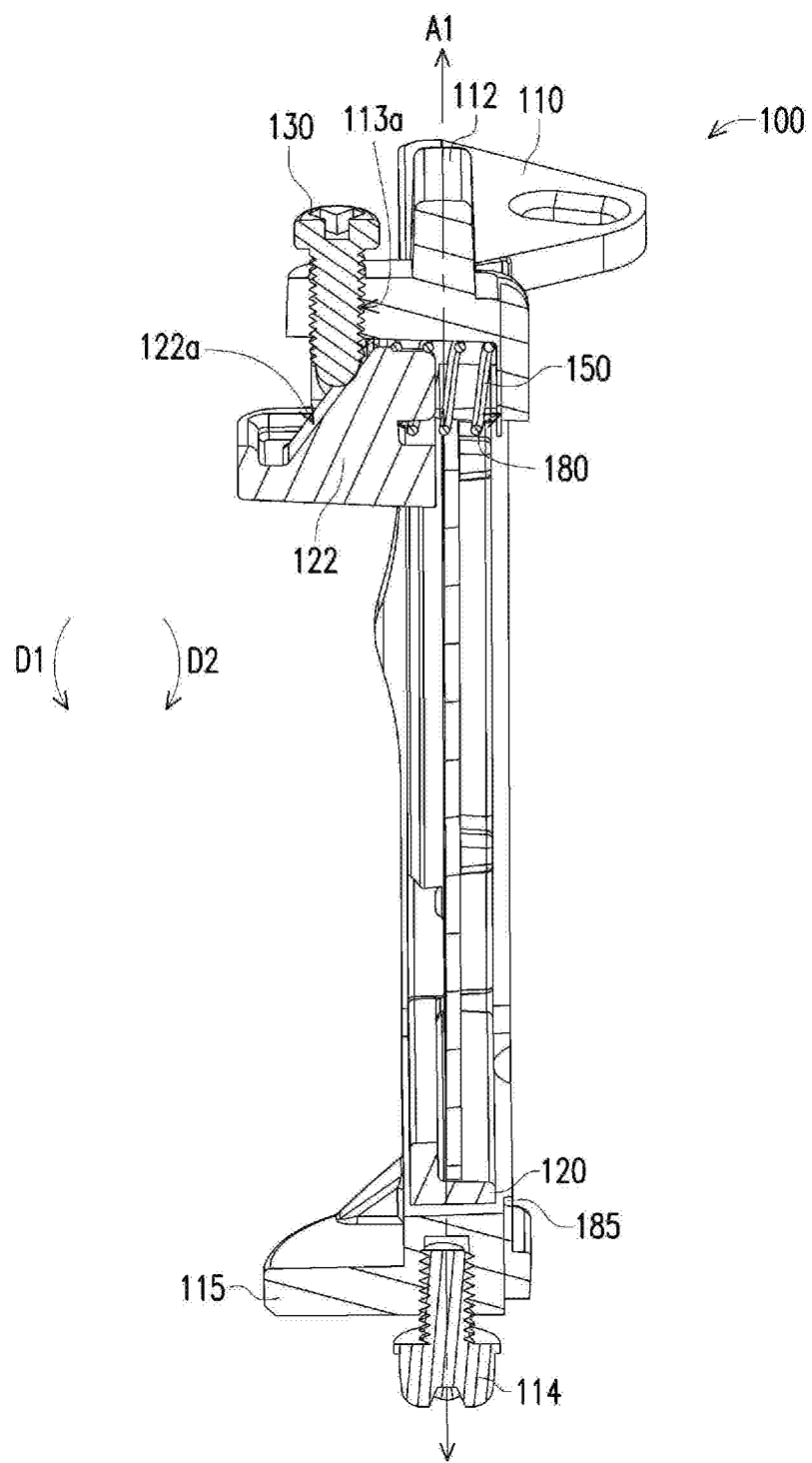
FIG. 8 is a schematic cross-sectional view of FIG. 6.
Figure 9:
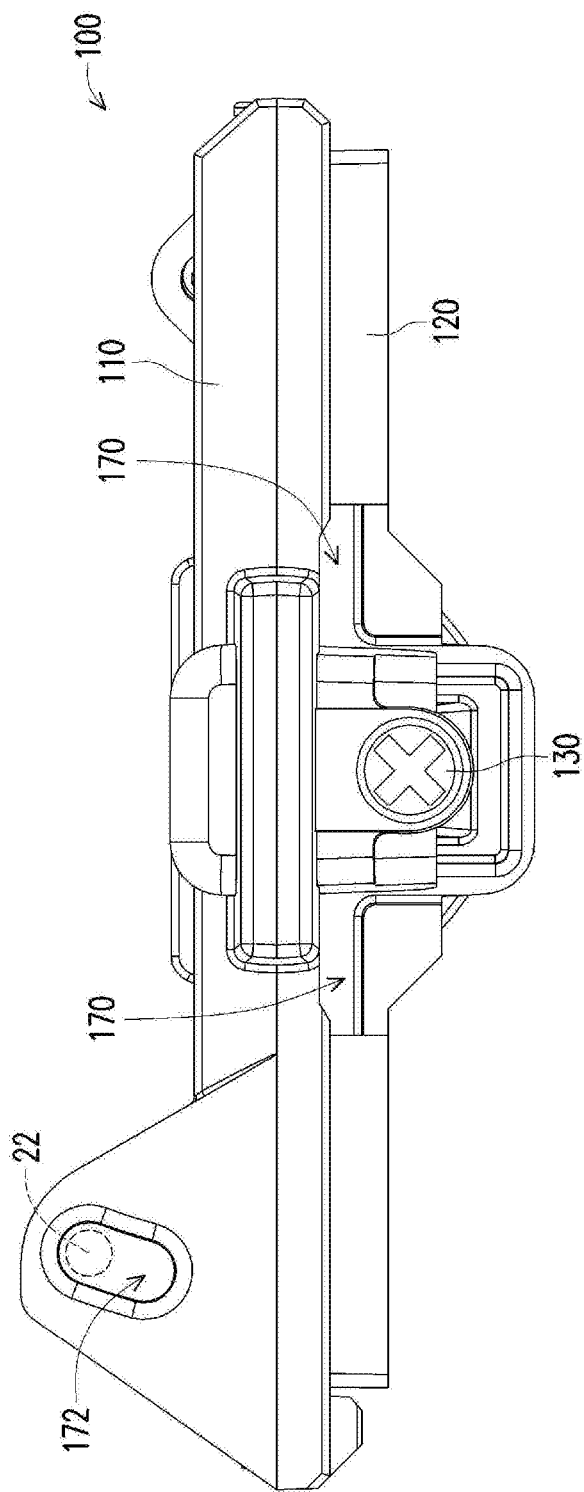
FIG. 9 is a schematic top view of FIG. 6.

The optical module 100 is first described below. Specifically, the optical module 100 may be separately applied to the projector 10. The invention is not limited thereto. FIG. 6 is a schematic perspective diagram of one optical module of an optical module assembly of FIG. 2. FIG. 7 is a schematic exploded view of FIG. 6. FIG. 8 is a schematic cross-sectional view of FIG. 6. FIG. 9 is a schematic top view of FIG. 6. Referring to FIG. 6 to FIG. 9, the optical module 100 of the embodiment includes a first frame body 110, a second frame body 120, a first adjustment member 130, and the first optical component 140.

The first frame body 110 is configured to be rotatably connected to the base body 20 (FIG. 3). More specifically, a bottom side of the first frame body 110 is pivoted at the base body 20 via a pivot portion 114 (FIG. 8), the pivot portion 114 is, for example, a screw, the first frame body 110 has a corresponding screw hole, but a type of the pivot portion 114 is not limited thereto. In the embodiment, the first frame body 110 includes a first adjustment portion 112 disposed on an upper side of the first frame body 110, and the first adjustment portion 112 and the pivot portion 114 overlap in a direction perpendicular to a connecting surface of the base body 20. With such design, the first frame body 110 can be easily rotated via the first adjustment portion 112, but the invention is not limited thereto. In other embodiments, the first adjustment portion 112 and the pivot portion 114 may also not overlap. Further, referring to FIG. 3 and FIG. 6, the first frame body 110 optionally includes at least partially an arc-shaped outer edge portion 115, the base body 20 has a groove 26 corresponding to the arc-shaped outer edge portion 115, and an inner contour of the groove 26 matches a contour of the arc-shaped outer edge portion 115 to accommodate and position the first frame body 110, so that assembling and positioning become convenient. In addition, the first adjustment portion 112 is located at a center of a contour formed by the arc-shaped outer edge portion 115, but a location of the first adjustment portion 112 is not limited thereto. Further, in the embodiment of FIG. 3, a diameter of the arc-shaped outer edge portion 115 of the first frame body 110 is between 10 mm and 20 mm, but the diameter of the arc-shaped outer edge portion 115 is not limited thereto.

As can be seen from FIG. 6 and FIG. 8, the first frame body 110 includes the first adjustment portion 112 and a boss 113 that are located on a same side of the first frame body 110. The first adjustment portion 112 is configured to drive the first frame body 110 to rotate with a first axial line A1 as a rotating axis, where the first axial line A1 is an axial line that is perpendicular to the connecting surface of the base body 20 (for example, a bottom surface of the groove 26 of the base body 20 as shown in FIG. 3) and that passes through the pivot portion 114. In the embodiment, the first adjustment portion 112 may be a protrusion or a groove, and may be used by a user to grasp or clamp or insert via a jig to adjust a rotation angle of the first frame body 110 more easily, so that the first frame body 110 rotates with the first axial line A1 as a rotating axis. In the embodiment, the rotation angle at which the first frame body 110 rotates with the first axial line A1 as the rotating axis is about 3 to 5 degrees, but the angle is not limited thereto.

Further, in the embodiment, the first adjustment portion 112 has a thickness less than that of the first frame body 110, and the thickness of the first adjustment portion 112 is greater than or equal to 2 millimeters (mm). The foregoing size range may be easier for the user to hold or hold the first adjustment portion 112 via a tool. Definitely, a location and a size of the first adjustment portion 112 are not limited thereto.

As shown in FIG. 6 and FIG. 7, the second frame body 120 is rotatably connected to the first frame body 110, the second frame body 120 has a second adjustment portion 122, and the second frame body 120 is pivoted at the first frame body 110 through a shaft portion 122b. The second adjustment portion 122 has a slant 122a, the slant 122a being inclined relative to the first axial line A1. The first optical component 140 is disposed on the second frame body 120 without relative movement with the second frame body 120. In the embodiment, the first optical component 140 is, for example, a beam splitter, but the first optical component 140 may also be a reflector, and a type of the first optical component 140 is not limited thereto.

In addition, in the embodiment, the boss 113 located on the first frame body 110 and on a same side with the first adjustment portion 112. The boss 113 has a screwing through hole 113a, and the first adjustment member 130 is screwed to the screwing through hole 113a of the boss 113 and protrudes from the screwing through hole 113a to abut against the second adjustment portion 122. As shown in FIG. 8, the screwing through hole 113a extends in a direction of the first axial line A1, and the first adjustment member 130 is configured to move up and down along the direction of the first axial line A1 relative to the boss 113 to push the slant 122a of the second adjustment portion 122 and drive the second frame body 120 to rotate with a second axial line A2 as a rotating axis, where the second axial line A2 is an axial line passing through the shaft portion 122b. In the embodiment, the first axial line A1 and the second axial line A2 are perpendicular to each other. Definitely, in other embodiments, the first axial line A1 and the second axial line A2 may also have an acute angle and are not limited to the drawings.

Referring to FIG. 8, in the embodiment, an optical module 100 further includes an elastic member 150, the elastic member 150 being disposed between the first frame body 110 and the second frame body 120. When the first adjustment member 130 moves toward a lower side of FIG. 8 relative to the boss 113, the slant 122a of the second adjustment portion 122 is pushed by the first adjustment member 130, and the second frame body 120 rotates in a second deflection direction D2. In this case, the elastic member 150 is compressed to generate an elastic force. When the first adjustment member 130 moves toward an upper side of FIG. 8 relative to the boss 113, the second frame body 120 is configured to be reset in a first deflection direction D1 opposite to the second deflection direction D2 via the elastic force of the elastic member 150.

It should be noted that, as shown in FIG. 8, in the embodiment, the optical module 100 further includes a first block 180 and a second block 185 that are located next to the second frame body 120 and located on two opposite sides of the second axial line A2. The first block 180 and the second block 185 are used to limit a rotation range of the second frame body 120 along the second axial line A2. More specifically, the first block 180 is located on a path on which the second frame body 120 moves along the second deflection direction D2, which serves as an end point of the second frame body 120 moving along the second deflection direction D2. The second block 185 is located on a path on which the second frame body 120 moves along the first deflection direction D1, which serves as an end point of the second frame body 120 moving along the first deflection direction D1. In the embodiment, angles at which the second frame body 120 rotates toward the first deflection direction D1 and the second deflection direction D2 along the second axial line A2 are respectively about 1 to 5 degrees, but the angles are not limited thereto.

It should be noted that, as shown in FIG. 9, in the embodiment, the first adjustment portion 112 and the boss 113 are disposed on an upper side of the first frame body 110 to facilitate the operator to directly adjust the angle from above. in order to dispose the first adjustment portion 112 and the boss 113 on a same side of the first frame body 110 in limited space, in the embodiment, the first adjustment portion 112 is disposed in a central region on the upper side of the first frame body 110, and the boss 113 (the first adjustment member 130) slightly deviates from the central region on the upper side of the first frame body 110. Definitely, in other embodiments, the first adjustment portion 112 does not have to be disposed in the central region on the upper side of the first frame body 110, or the boss 113 may be disposed in the central region on the upper side of the first frame body 110, and the first adjustment portion 112 slightly deviates from the central region on the upper side of the first frame body 110.

As shown in FIG. 9, in the embodiment, one of the first frame body 110 and the second frame body 120 includes a glue groove 170, and the glue groove 170 exposes the other of the first frame body 110 and the second frame body 120. After relative positions of the first frame body 110 and the second frame body 120 are adjusted to be positioned, the glue groove 170 is provided for a glue to be filled in to fix the relative positions of the first frame body 110 and the second frame body 120.

In addition, in the embodiment, the base body 20 (FIG. 2) includes a positioning rod 22 (FIG. 9). The first frame body 110 includes a glue groove 172, and the positioning rod 22 extends into the glue groove 172 to indicate the relative positions of the first frame body 110 and the base body 20. For example, the first frame body 110 may be provided with a scale beside the glue groove 172, and the assembler may read a relative position of the positioning rod 22 in the glue groove 172, and accordingly determine whether a position of the first frame body 110 relative to the base body 20 is correct. In the embodiment, an aperture of the glue groove 172 is greater than 2 millimeters (mm), an aperture of the positioning rod 22 is less than the aperture of the glue groove 172 and greater than 1.5 millimeters (mm), but the aperture of the glue groove 172 and the aperture of the positioning rod 22 are not limited thereto. It should be noted that, after the relative positions of the first frame body 110 and the base body 20 are adjusted to be positioned, the glue groove 172 is provided for the glue to be filled in to fix the relative positions of the first frame body 110 and the second frame body 20.

In the embodiment, when a rotation angle of the first optical component 140 of the optical module 100 is to be adjusted, the first adjustment portion 112 located above the first frame body 110 may be first grasped by hand or using a jig to rotate the first frame body 110, so that the first optical component 140 may rotate about the first axial line A1 to achieve an effect of horizontal adjustment. Furthermore, the first adjustment member 130 located above the first frame body 110 is rotated, so that the first adjustment member 130 moves up and down in the direction of the first axial line A1. The first adjustment member 130 pushes the slant 122a of the second adjustment portion 122, and the second frame body 120 may be correspondingly rotated along the second axial line A2, so that the first optical component 140 can achieve an effect of vertical adjustment, which is quite convenient and simple to operate.

Figure 11:
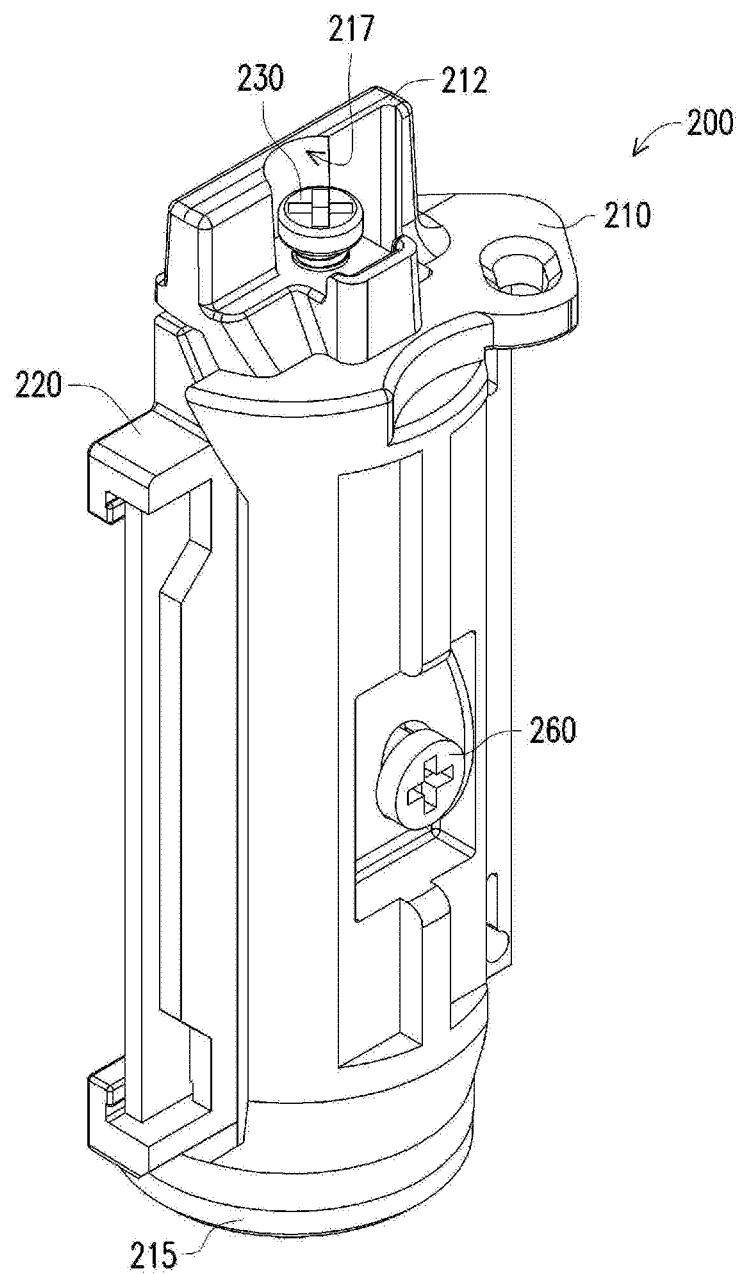
FIG. 11 is a schematic perspective back view of FIG. 10.
Figure 12:
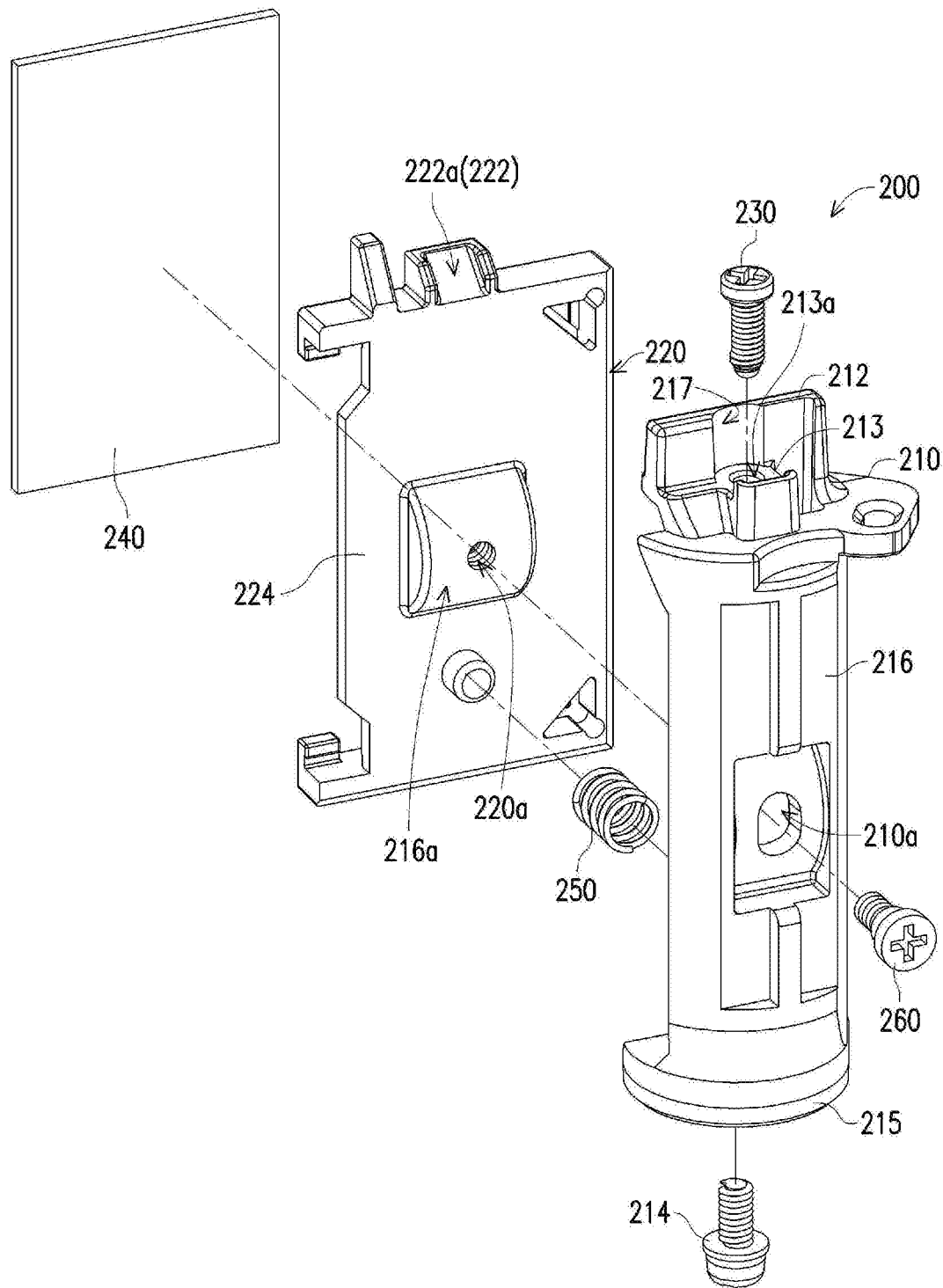
FIG. 12 is a schematic exploded view of FIG. 11.
Figure 13:
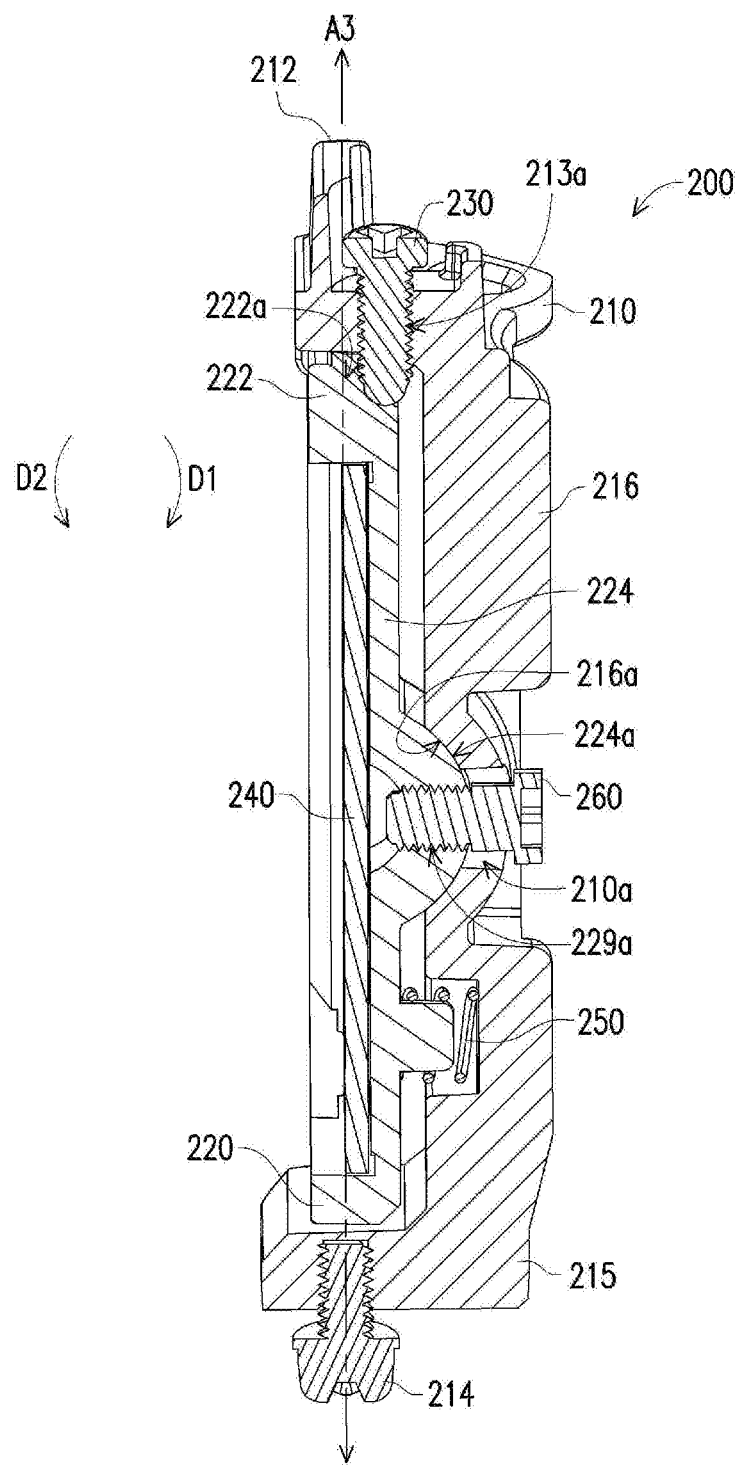
FIG. 13 is a schematic cross-sectional view of FIG. 10.
Figure 14:
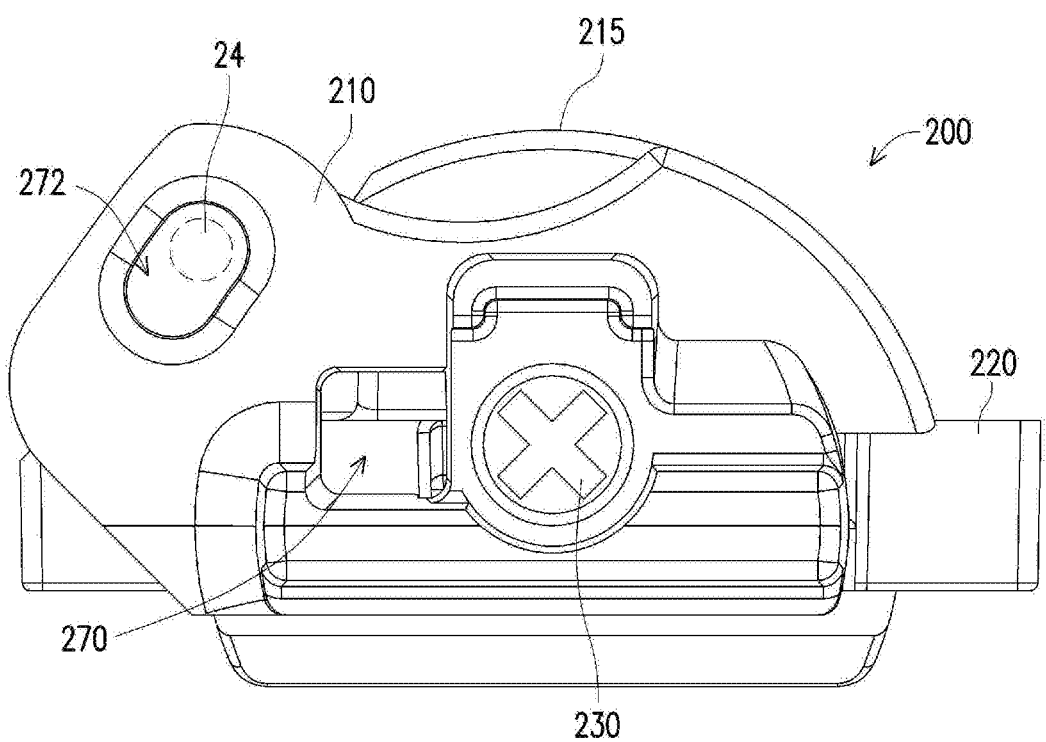
FIG. 14 is a schematic top view of FIG. 10.

Next, another optical module 200 is described. Specifically, the optical module 200 may be separately applied to the projector 10, and the invention is not limited thereto. Referring to FIG. 10 to FIG. 14, FIG. 10 is a schematic perspective front view of another optical module of an optical module assembly of FIG. 2. FIG. 11 is a schematic perspective back view of FIG. 10. FIG. 12 is a schematic exploded view of FIG. 11. FIG. 13 is a schematic cross-sectional view of FIG. 10. FIG. 14 is a schematic top view of FIG. 10. The optical module 200 of the embodiment includes a first frame body 210 (which may also be regarded as a third frame body), a second frame body 220 (which may also be regarded as a fourth frame body), a first adjustment member 230 (which may also be regarded as a second adjustment member), and a first optical component 240 (which may also be regarded as a second optical component).

The first frame body 210 is configured to be rotatably connected to the base body 20 (FIG. 3). More specifically, the first frame body 210 is pivoted at the base body 20 via a pivot portion 214 (FIG. 13), the pivot portion 214 is, for example, a screw, the first frame body 210 has a corresponding screw hole, but a type of the pivot portion 214 is not limited thereto. In the embodiment, the first frame body 210 includes a first adjustment portion 212 disposed on an upper side of the first frame body 210, and the first adjustment portion 212 and the pivot portion 214 overlap in a direction perpendicular to a connecting surface of the base body 20. With such design, the first frame body 210 may be easily rotated via the first adjustment portion 212, but the invention is not limited thereto. In other embodiments, the first adjustment portion 212 and the pivot portion 214 may also not overlap. Further, referring to FIG. 3, the first frame body 210 may include at least partially an arc-shaped outer edge portion 215, the base body 20 has a groove 28 (FIG. 3) corresponding to the arc-shaped outer edge portion 215, and an inner contour of the groove 28 matches a contour of the arc-shaped outer edge portion 215 to accommodate and position the first frame body 210, so that assembling and positioning become convenient. The first adjustment portion 212 is located at a center of a contour formed by the arc-shaped outer edge portion 215, but a location of the first adjustment portion 212 is not limited thereto.

Figure 10:
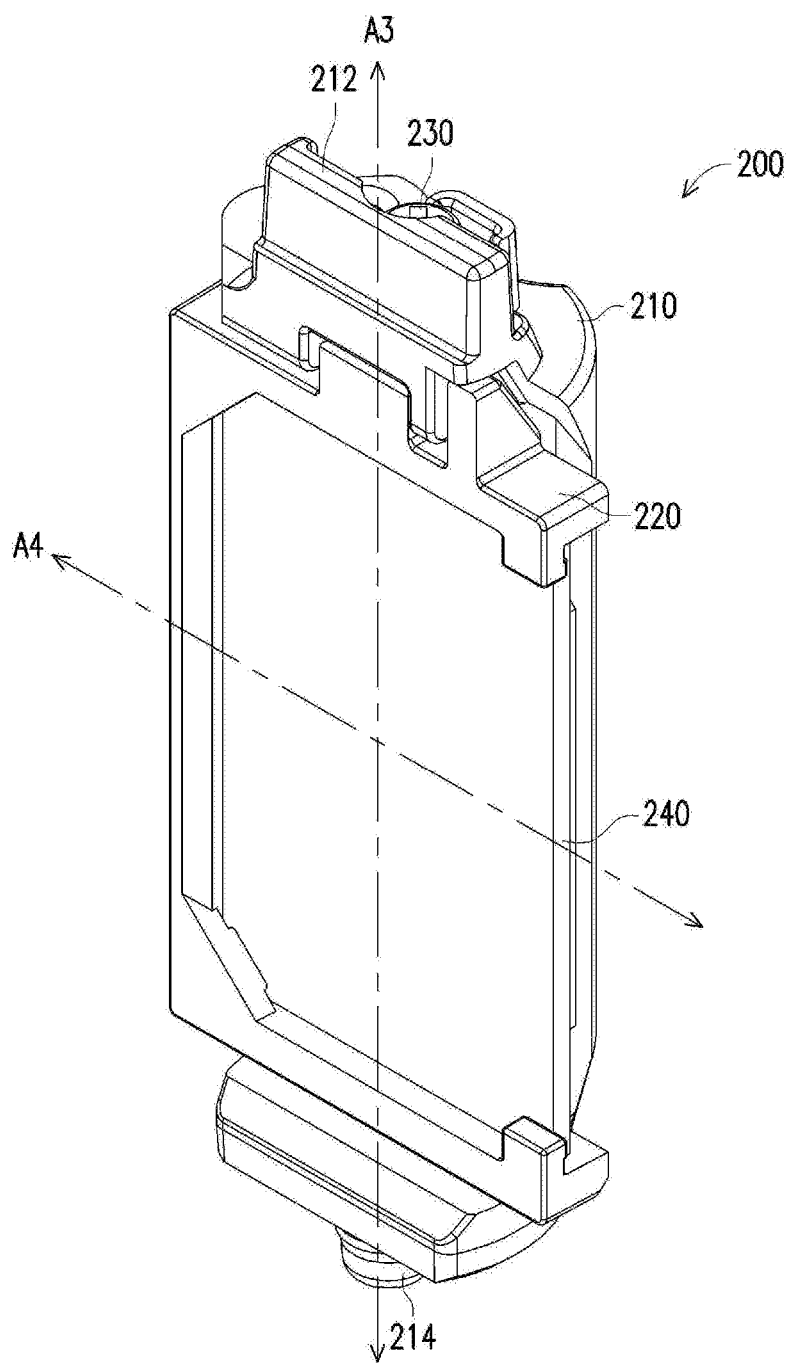
FIG. 10 is a schematic perspective front view of another optical module of an optical module assembly of FIG. 2.

As can be seen from FIG. 10 and FIG. 12, the first frame body 210 includes the first adjustment portion 212 and a boss 213 that are located on a same side of the first frame body 210. In the embodiment, the first adjustment portion 212 has a concave arc 217 to give way to a first adjustment member 230. The first adjustment portion 212 is configured to drive the first frame body 210 to rotate with a first axial line A3 as a rotating axis, where the first axial line A3 is an axial line that is perpendicular to a connecting surface of a base body 20 (for example, a bottom surface of the groove 28 of the base body 20 as shown in FIG. 3) and that passes through a pivot portion 214. In the embodiment, the first adjustment portion 212 may be a protrusion or a groove, and may be used by a user to grasp or clamp or insert via a jig to adjust an angle of the first frame body 210 more easily, so that the first frame body 210 rotates with the first axial line A3 as a rotating axis. In the embodiment, the angle at which the first frame body 210 rotates with the first axial line A3 as the rotating axis is about 3 to 5 degrees, but the angle is not limited thereto.

As shown in FIG. 13, the second frame body 220 is configured to be rotatably connected to the first frame body 210, the second frame body 220 including a second adjustment portion 222. The second adjustment portion 222 has a slant 222a, the slant 222a being inclined relative to the first axial line A3. The first optical component 240 is disposed on the second frame body 220 without relative movement with the second frame body 220. In the embodiment, the first optical component 240 is, for example, a reflector, but the first optical component 240 may also be a beam splitter, and a type of the first optical component 240 is not limited thereto.

It should be noted that, in the embodiment, the main difference between the optical module 200 and the optical module 100 is that, as shown in FIG. 6, the optical module 100 is pivotally connected through the shaft portion 122b to cause the second frame body 120 to be pivoted at the first frame body 110 along the second axial line A2. In the embodiment, as shown in FIG. 12 and FIG. 13, the first frame body 210 of the optical module 200 has a first back plate portion 216, and the second frame body 220 has a second back plate portion 224, the second back plate portion 224 covering a back surface of the first optical component 240. The first back plate portion 216 has a concave arc surface 216a, the second back plate portion 224 has a convex arc surface 224a, the convex arc surface 224a and the concave arc surface 216a abutting against each other, and the second frame body 220 is rotated with relative sliding of the convex arc surface 224a and the concave arc surface 216a.

In the embodiment, the first frame body 210 has an opening 210a, the second frame body 220 has a locking hole 220a, the opening 210a being located on the concave arc surface 216a, and the locking hole 220a being located on the convex arc surface 224a, and a locking element 260 passes through the opening 210a and is screwed into the locking hole 220a. As shown in FIG. 12, the opening 210a has an aperture along the first axial line A3 larger than an aperture of the locking hole 220a. In other words, the opening 210a has a long groove shape, so that the locking element 260 can move relative to the opening 210a. With such design, the second frame body 220 rotates relative to the first frame body 210 along the second axial line A4, where the second axial line A4 is the axial line that is perpendicular to the first axial line A3 and that passes through a center of curvature of the convex arc surface 224a (in the embodiment, the second axial line A4 passes through a geometric center of the first optical component 240).

In addition, in the embodiment, the boss 213 has a screwing through hole 213a, and the first adjustment member 230 is screwed to the screwing through hole 213a of the boss 213 and protrudes from the screwing through hole 213a to abut against the second adjustment portion 222. As shown in FIG. 13, the screwing through hole 213a extends along the first axial line A3, and the first adjustment member 230 is configured to move along the direction of the first axial line A3 relative to the boss 213 to push the slant 222a of the second adjustment portion 222 and drive the second frame body 220 to rotate with a second axial line A4 as a rotating axis. In the embodiment, the first axial line A3 and the second axial line A4 are perpendicular to each other. Definitely, in other embodiments, the first axial line A3 and the second axial line A4 may also have an acute angle and are not limited to the drawings.

In the embodiment, an optical module 200 further includes an elastic member 250, the elastic member 250 being disposed between the first frame body 210 and the second frame body 220. In the embodiment, the elastic member 250 and the first adjustment member 230 respectively abut against the second frame body 220 and are disposed relative to two sides of the convex arc surface 224a of the second back plate portion 224. When the first adjustment member 230 moves toward a lower side of FIG. 13 relative to the boss 213, the slant 222a of the second adjustment portion 222 is pushed by the first adjustment member 230 to cause the second frame body 220 to rotate in a second deflection direction D2 (FIG. 13). In this case, the elastic member 250 is compressed to generate an elastic force. When the first adjustment member 230 moves toward an upper side of FIG. 13 relative to the boss 213, the second frame body 220 is configured to be reset in a first deflection direction D1 (FIG. 13) opposite to the second deflection direction D2 via the elastic force of the elastic member 250.

As shown in FIG. 14, in the embodiment, one of the first frame body 210 and the second frame body 220 includes a glue groove 270, and the glue groove 270 exposes the other of the first frame body 210 and the second frame body 220. The glue groove 270 is provided for the glue to be filled in to fix relative positions of the first frame body 210 and the second frame body 220. In addition, in the embodiment, the base body 20 (FIG. 2) includes a positioning rod 24 (FIG. 14). The first frame body 210 includes a glue groove 272, and the positioning rod 24 extends into the glue groove 272 to indicate relative positions of the first frame body 210 and the base body 20. It should be noted that, after the relative positions of the first frame body 210 and the second frame body 20 are adjusted to be positioned, the glue groove 272 is provided for the glue to be filled in to fix the relative positions of the first frame body 210 and the base body 20.

It should be noted that, in the embodiment, a difference between the optical modules 100 and 200 lies in only different types of the first optical components 140 and 240, whether the first frame bodies 110, 210 and the second frame bodies 120, 220 are hollowed out, and in a pivot manner. Definitely, differences between the optical modules 100, 200 are not only limited to the above.

Based on the above, the first adjustment portion of the optical module of the invention is configured to drive the first frame body to rotate with the first axial line as the rotating axis, and the first adjustment member is configured to move in the direction of the first axial line relative to the boss to push the second adjustment portion and drive the second frame body to rotate with the second axial line as the rotating axis, so that the first optical component moves along both axes. The projector of the invention can provide a relatively good optical effect through the foregoing optical module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, comprising a first frame body, a second frame body, a first adjustment member, and a first optical component, wherein
   the first frame body is rotatably connected to a base body, the first frame body comprises a first adjustment portion and a boss that are located on a same side of the first frame body, and the first adjustment portion drives the first frame body to rotate with a first axial line as a rotating axis,
   the second frame body is rotatably connected to the first frame body, and the second frame body comprises a second adjustment portion,
   the first adjustment member is screwed to the boss, wherein the first adjustment member moves along the first axial line relative to the boss to push the second adjustment portion and drive the second frame body to rotate with a second axial line as a rotating axis, and
   the first optical component is disposed on the second frame body.

2. The optical module according to claim 1, wherein the boss comprises a screwing through hole, and the first adjustment member is screwed to the screwing through hole and protrudes from the screwing through hole to abut against the second adjustment portion.

3. The optical module according to claim 1, wherein the second adjustment portion comprises a slant, the slant is inclined relative to the first axial line, and the first adjustment member moves along the first axial line to push the slant.

4. The optical module according to claim 1, wherein the first frame body comprises a first back plate portion, and the second frame body comprises a second back plate portion, wherein the second back plate portion covers a back surface of the first optical component, the first back plate portion comprises a concave arc surface, the second back plate portion comprises a convex arc surface, the convex arc surface and the concave arc surface abut against each other, and the second frame body rotates as the convex arc surface and the concave arc surface slide relative to each other.

5. The optical module according to claim 1, further comprising an elastic member, wherein the elastic member is disposed between the first frame body and the second frame body, the first adjustment member drives the second frame body to rotate in a first deflection direction, and the second frame body is reset in a second deflection direction opposite to the first deflection direction via an elastic force of the elastic member.

6. The optical module according to claim 5, wherein the second frame body comprises a second back plate portion, the second back plate portion comprises a convex arc surface, and the elastic member and the first adjustment member respectively abut against the second frame body and are disposed relative to two sides of the convex arc surface of the second back plate portion.

7. The optical module according to claim 1, further comprising a third frame body, a fourth frame body, a second adjustment member, and a second optical component that are disposed next to the first frame body, the second frame body, the first adjustment member, and the first optical component, wherein the third frame body rotates with a third axial line parallel to the first axial line as a rotating axis, the second adjustment member pushes the fourth frame body to rotate with a fourth axial line parallel to the second axial line as a rotating axis, and the second optical component is disposed on the fourth frame body.

8. The optical module according to claim 7, wherein the first optical component is a beam splitter, and the second optical component is a reflector.

9. The optical module according to claim 1, wherein one of the first frame body and the second frame body comprises a glue groove, the glue groove exposes the other of the first frame body and the second frame body, and the glue groove is provided for glue to be filled in to fix relative locations of the first frame body and the second frame body.

10. The optical module according to claim 1, further comprising a first block and a second block that are located beside the second frame body and located on two sides of the second axial line, wherein the first block and the second block restrict a rotation range of the second frame body along the second axial line.

11. The optical module according to claim 1, wherein the first axial line and the second axial line are perpendicular to each other.

12. A projector, comprising a light source, a light valve, a projection lens, and an optical module, wherein
    the light source provides an illumination beam,
    the light valve is disposed on a transmission path of the illumination beam and converts the illumination beam into an image beam,
    the projection lens is disposed on a transmission path of the image beam and projects the image beam to outside the projector, and
    the optical module is located on the transmission path of the illumination beam or the image beam and comprises a first frame body, a second frame body, a first adjustment member, and a first optical component, wherein the first frame body is rotatably connected to a base body, the first frame body comprises a first adjustment portion and a boss that are located on a same side of the first frame body, and the first adjustment portion drives the first frame body to rotate with a first axial line as a rotating axis, the second frame body is rotatably connected to the first frame body, and the second frame body comprises a second adjustment portion, the first adjustment member is screwed to the boss, wherein the first adjustment member moves along the first axial line relative to the boss to push the second adjustment portion and drive the second frame body to rotate with a second axial line as a rotating axis, and the first optical component is disposed on the second frame body.

13. The projector according to claim 12, wherein the boss comprises a screwing through hole, and the first adjustment member is screwed to the screwing through hole and protrudes from the screwing through hole to abut against the second adjustment portion.

14. The projector according to claim 12, wherein the second adjustment portion comprises a slant, the slant is inclined relative to the first axial line, and the first adjustment member moves along the first axial line to push the slant.

15. The projector according to claim 12, wherein the first frame body comprises a first back plate portion, and the second frame body comprises a second back plate portion, wherein the second back plate portion covers a back surface of the first optical component, the first back plate portion comprises a concave arc surface, the second back plate portion comprises a convex arc surface, the convex arc surface and the concave arc surface abut against each other, and the second frame body rotates as the convex arc surface and the concave arc surface slide relative to each other.

16. The projector according to claim 12, wherein the optical module further comprises an elastic member, wherein the elastic member is disposed between the first frame body and the second frame body, the first adjustment member drives the second frame body to rotate in a first deflection direction, and the second frame body is reset in a second deflection direction opposite to the first deflection direction via an elastic force of the elastic member.

17. The projector according to claim 16, wherein the second frame body comprises a second back plate portion, the second back plate portion comprises a convex arc surface, and the elastic member and the first adjustment member respectively abut against the second frame body and are disposed relative to two sides of the convex arc surface of the second back plate portion.

18. The projector according to claim 12, wherein the optical module further comprises a third frame body, a fourth frame body, a second adjustment member, and a second optical component that are disposed next to the first frame body, the second frame body, the first adjustment member, and the first optical component, wherein the third frame body rotates with a third axial line parallel to the first axial line as a rotating axis, the second adjustment member pushes the fourth frame body to rotate with a fourth axial line parallel to the second axial line as a rotating axis, and the second optical component is disposed on the fourth frame body.

19. The projector according to claim 18, wherein the first optical component is a beam splitter, and the second optical component is a reflector.

20. The projector according to claim 18, wherein one of the first frame body and the second frame body comprises a glue groove, the glue groove exposes the other of the first frame body and the second frame body, and the glue groove is provided for glue to be filled in to fix relative locations of the first frame body and the second frame body.

\* \* \* \* \*